(12) United States Patent
Mercado Alvarado

(10) Patent No.: US 12,383,850 B2
(45) Date of Patent: Aug. 12, 2025

(54) AUTOMATIC SELF-CLEANING FILTER DRIVEN BY SUBMERSIBLE ACTUATOR

(71) Applicant: Adalberto Mercado Alvarado, Bayamon, PR (US)

(72) Inventor: Adalberto Mercado Alvarado, Bayamon, PR (US)

( * ) Notice: Subject to any disclaimer, the term of this patent is extended or adjusted under 35 U.S.C. 154(b) by 880 days.

(21) Appl. No.: 17/577,224

(22) Filed: Jan. 17, 2022

(65) Prior Publication Data

US 2022/0143535 A1 May 12, 2022

Related U.S. Application Data

(63) Continuation-in-part of application No. 17/471,546, filed on Sep. 10, 2021, which is a continuation-in-part of application No. 17/164,367, filed on Feb. 1, 2021, now Pat. No. 12,233,388, which is a continuation-in-part of application No. 16/906,882, filed on Jun. 19, 2020, now Pat. No. 11,766,644, which is a continuation-in-part of application No. 15/787,758, filed on Oct. 19, 2017, now Pat. No. 10,766,011.

(51) Int. Cl.
| | | |
|---|---|---|
| *B01D 29/64* | (2006.01) | |
| *B01D 29/23* | (2006.01) | |
| *B01D 29/94* | (2006.01) | |
| *B01D 35/30* | (2006.01) | |
| *B01D 39/10* | (2006.01) | |
| *C02F 11/125* | (2019.01) | |
| *C02F 11/147* | (2019.01) | |

(52) U.S. Cl.
CPC ......... *B01D 29/6415* (2013.01); *B01D 29/23* (2013.01); *B01D 29/945* (2013.01); *B01D 35/30* (2013.01); *B01D 39/10* (2013.01); *C02F 11/125* (2013.01); *C02F 11/147* (2019.01); *B01D 2201/302* (2013.01); *B01D 2201/40* (2013.01); *C02F 2303/16* (2013.01)

(58) Field of Classification Search
CPC .. B01D 29/6415; B01D 29/23; B01D 29/945; B01D 35/30; B01D 39/10; B01D 2201/302; B01D 2201/40; C02F 11/125; C02F 11/147; C02F 2303/16; C02F 1/001; C02F 1/385
USPC ....... 210/348, 248, 364–367, 369, 378, 407, 210/408, 411, 414, 427, 106–108, 333.01
See application file for complete search history.

(56) References Cited

FOREIGN PATENT DOCUMENTS

EP 2082793 A1 * 7/2009 ........... B01D 29/118

* cited by examiner

*Primary Examiner* — Madeline Gonzalez
(74) *Attorney, Agent, or Firm* — Eugenio J. Torres-Oyola; Victor M. Rodriguez-Reyes; Rafael Rodriguez-Muriel

(57) ABSTRACT

An automatic self-cleaning filter that is driven by a submersible actuator and is configured to clean or filter one or more substances from a liquid.

9 Claims, 23 Drawing Sheets

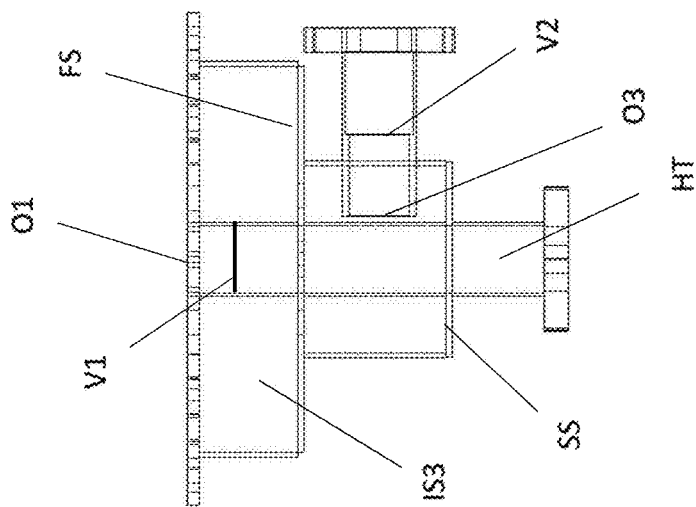
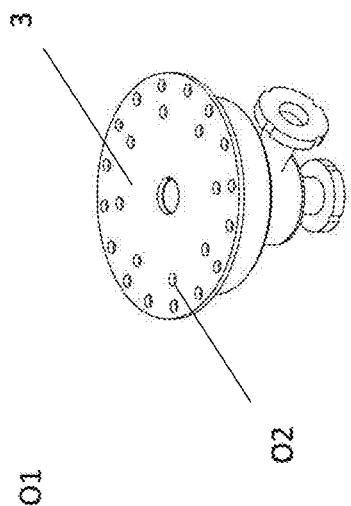
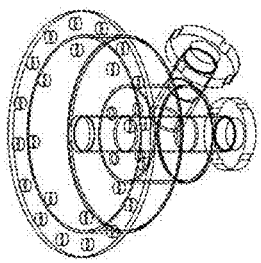
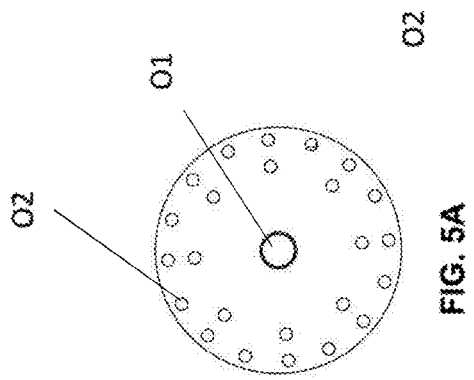
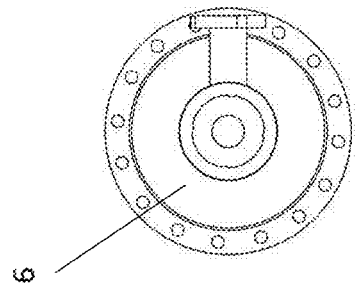

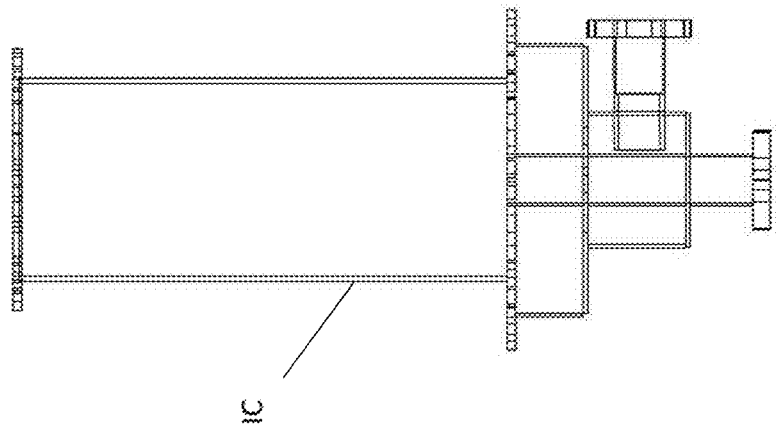
FIG. 6D
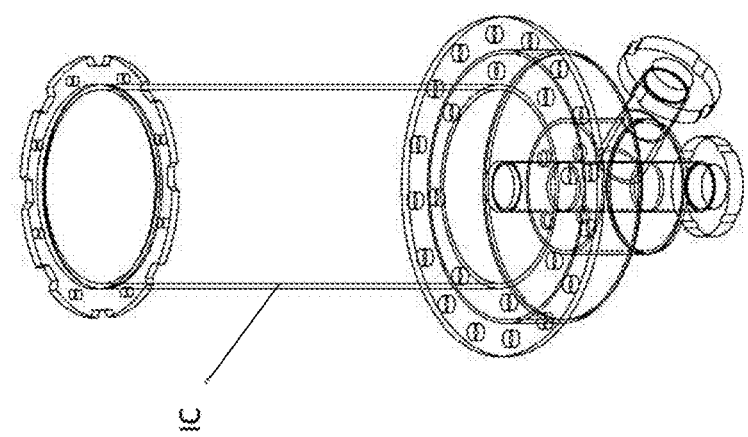
FIG. 6C
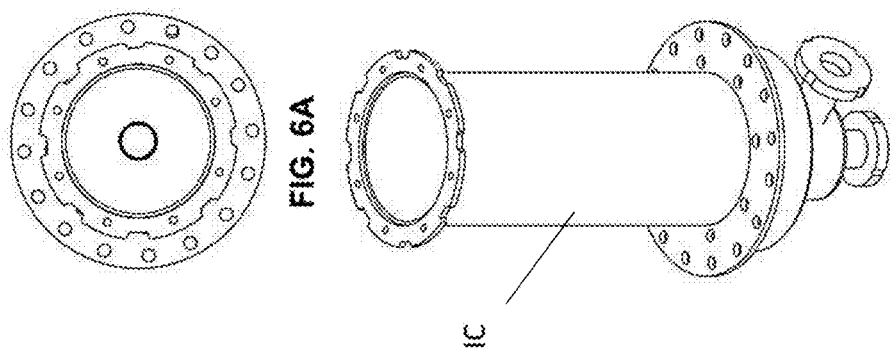
FIG. 6A
FIG. 6B

AUTOMATIC SELF-CLEANING FILTER DRIVEN BY SUBMERSIBLE ACTUATOR

CROSS-REFERENCE TO RELATED APPLICATION

This application is a continuation-in-part of, and claims the benefit of priority to, U.S. patent application Ser. No. 17/471,546, entitled "Substance Separator System driven by a Submersible Actuator", incorporated by reference in its entirety herein, which in turn is a continuation-in-part of U.S. patent application Ser. No. 17/164,367, filed on Feb. 1, 2021, entitled "Liquid Polymer or Chemical Activation System Using a Submersible Actuator", incorporated by reference in its entirety herein, which in turn is a continuation-in-part of U.S. patent application Ser. No. 16/906,882, filed on Jun. 16, 2020, entitled "Liquid Polymer or Chemical Activation System Using a Submersible Actuator", and incorporated by reference in its entirety herein, which in turn is a continuation-in-part of U.S. patent application Ser. No. 15/787,758, filed on Oct. 19, 2017, entitled "Liquid Polymer Activation System Using a Submersible Actuator" the contents of which are hereby incorporated by reference.

STATEMENT REGARDING FEDERALLY SPONSORED RESEARCH AND DEVELOPMENT

N/A

BACKGROUND OF THE INVENTION

Field of the Invention

The present invention relates to an automatic self-cleaning filter driven by a submersible actuator that is configured to separate substances within a liquid.

Discussion of the Background

Generally, mechanical blending systems are used in the separation of liquids from solids (and vice versa) on water treatment plants, waste-water treatment plants, pharmaceutical plants, food and beverage plants, diary, distillery, power plants, industrial plants and mining processing facilities.

Therefore, there is a need for a mechanical blending system that provides a correct and constant blend if the inlet water feed pressure is under 35 PSI and 60 PSI for a non-mechanical blender. There is also a need for a liquid separator system mechanically driven by a submersible motor.

SUMMARY OF THE INVENTION

An automatic self-cleaning filter, comprising: an outer chamber having a first distal end and a second distal end, wherein each distal end is opposite to each other; wherein the first distal end of the outer chamber includes a first chamber flange; wherein the second distal end of the outer chamber includes a second chamber flange; a top cover plate connected to or secured to the first chamber flange on the first distal end of the outer chamber; a bottom chamber having a bottom chamber flange, a first outlet and a second outlet; wherein the bottom chamber is connected to or secured to the second chamber flange on the second distal end of the outer chamber; a filter cup; an interconnecting shaft; a brush holder; at least one brush; a submersible actuator; an interconnecting plate for providing support to the filter cup; an interconnecting cup for providing support to the interconnecting plate; a lower cup for supporting the submersible actuator; and an interior chamber within the outer chamber; wherein the second outlet corresponds to the outer chamber and the first outlet corresponds to the interior chamber; wherein a first end of the interconnecting shaft is configured to be coupled to the brush holder via a coupling mechanism and second end of the interconnecting shaft is configured to be coupled to a top end of the submersible actuator via a shaft coupling unit; wherein the top cover plate includes at least one inlet that is configured to receive an unfiltered liquid or substance and to provide access to said unfiltered liquid or substance into the filter cup; wherein the filter cup comprises a receptacle having a base and walls that perpendicularly extend from said base, thereby creating an opening opposite to the base that is configured to receive the unfiltered liquid or substance from the inlet; wherein the base of the receptacle includes an opening configured to provide access to the interconnecting shaft or brush holder into the receptacle; wherein the filter cup further comprises, within the receptacle, a removable filter screen or mesh surrounding and conforming to the walls of the receptacle; wherein the filter cup includes one or more openings on the walls of the receptacle that are covered by the filter screen or mesh; wherein the interconnecting plate includes one or more holes configured to provide access to liquid that has been filtered in the filter cup into an interior space within the outer chamber; wherein the bottom chamber flange of the bottom chamber has a primary opening and a secondary opening; wherein spinning of the interconnecting shaft, in response to power generated by the submersible actuator, causes the brush to push the unfiltered liquid or substance against the walls of the receptacle, which will in turn cause the sediment from the unfiltered liquid or substance to stay within the receptacle and the filtered liquid to pass through the filter screen or mesh moving out of the receptacle into the interconnecting plate where it will then be led, via the one or more holes therein, into the interior space within the outer chamber, and subsequently into the bottom chamber, via the secondary opening, until it reaches the second outlet, and wherein the sediment left behind in the receptacle will be led into the interior chamber and subsequently into the bottom chamber, via the primary opening, until it reaches the first outlet.

BRIEF DESCRIPTION OF THE DRAWINGS

FIGS. 5A-E show different views of the bottom chamber of the automatic self-cleaning filter, in accordance with the principles of the present invention.

FIGS. 6A-D show different views of the interior chamber of the automatic self-cleaning filter, in accordance with the principles of the present invention.

DETAILED DESCRIPTION OF THE INVENTION

Figure 1:
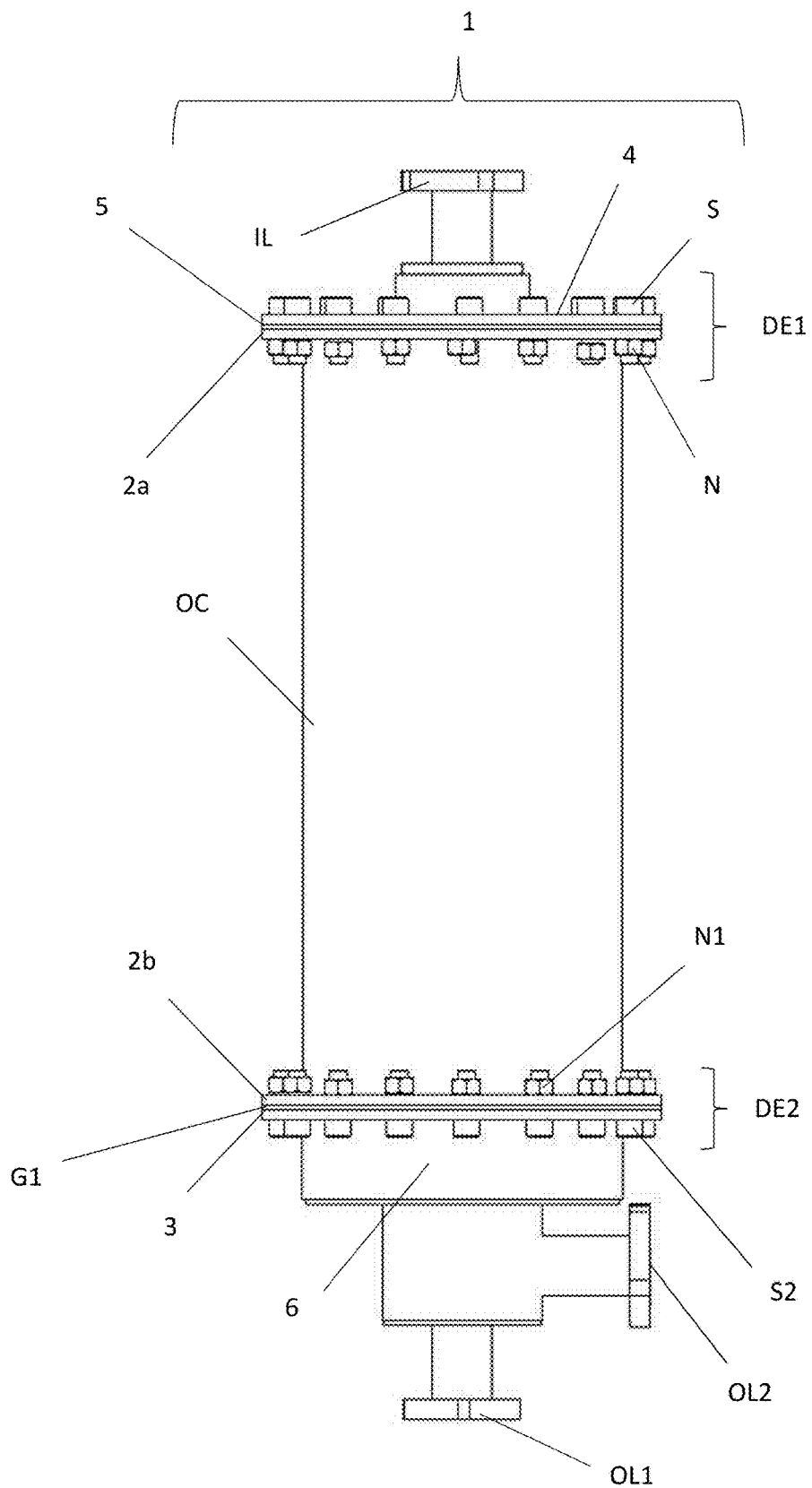
FIG. 1 shows the exterior components of an automatic self-cleaning filter, in accordance with the principles of the present invention.

FIGS. 1-18 show an automatic self-cleaning filter 1 that is driven by a submersible actuator and is configured to clean or filter one or more substances from a liquid. As shown in FIG. 1, the self-cleaning filter 1 comprises an outer hollow chamber OC having a first distal end DE1 and a second distal end DE2, wherein each distal end is opposite to each other. The first distal end DE1 of the outer chamber OC includes a first chamber flange 2a having one or more holes configured to receive one or more bolts, screws or fasteners S. Similarly, the second distal end DE2 of the outer chamber OC includes a second chamber flange 2b having one or more holes configured to receive one or more bolts, screws or fasteners S1. The outer chamber OC may be circular in shape, as shown in FIGS. 1-18; but may also have any other shape.

Figure 2:
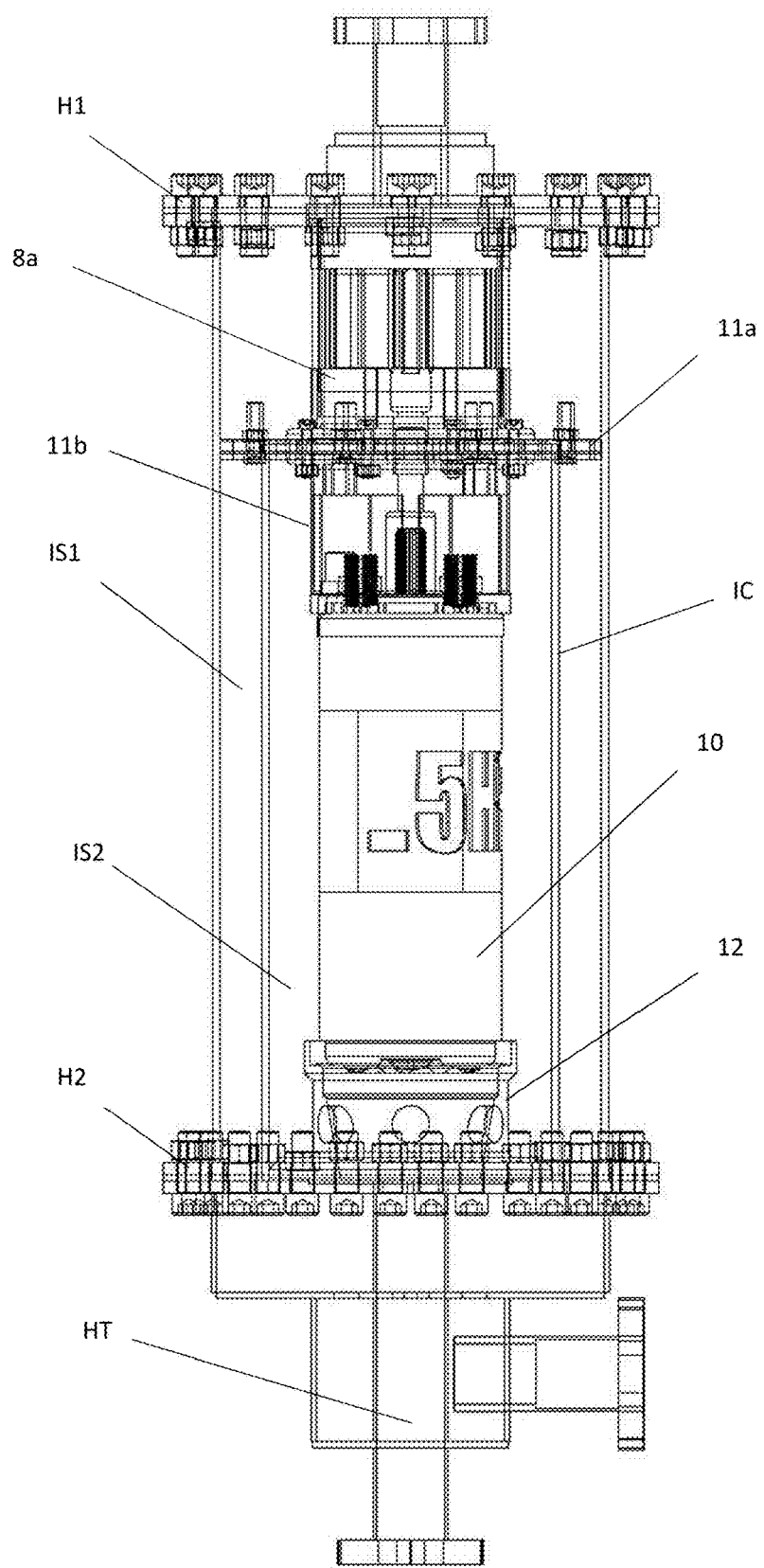
FIG. 2 shows the interior components of the automatic self-cleaning filter, in accordance with the principles of the present invention.
Figure 3:
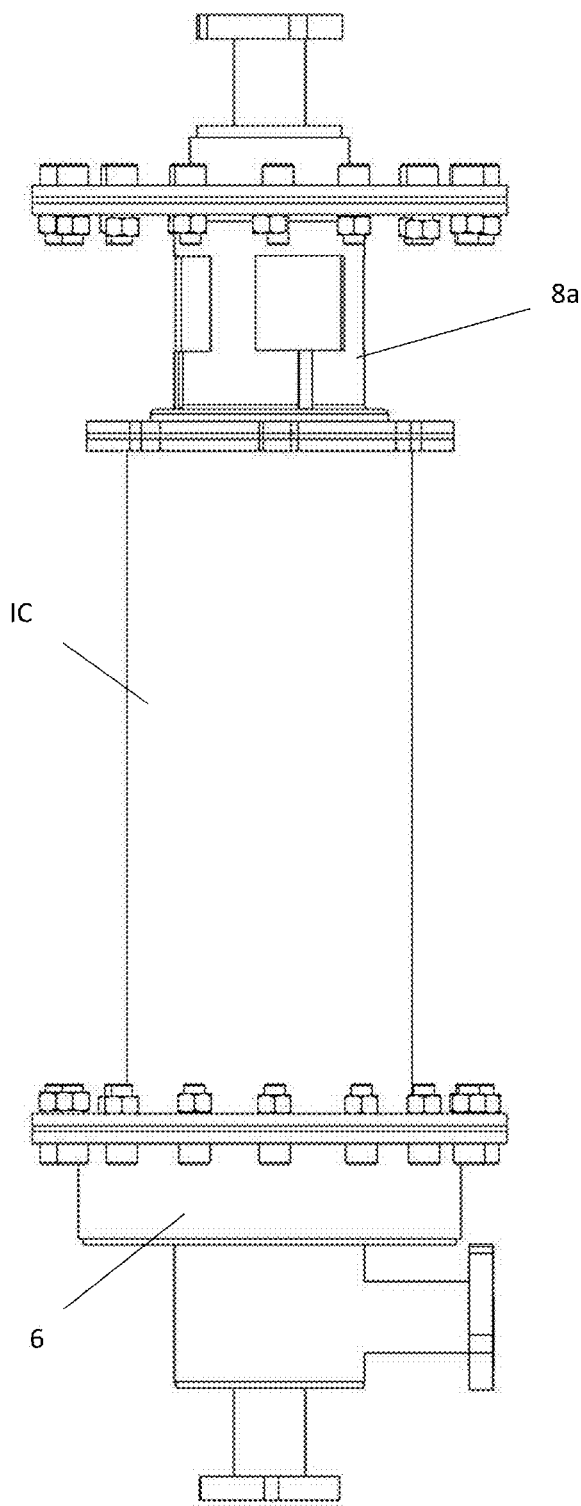
FIG. 3 shows the interior chamber of the automatic self-cleaning filter, in accordance with the principles of the present invention.
Figure 4:
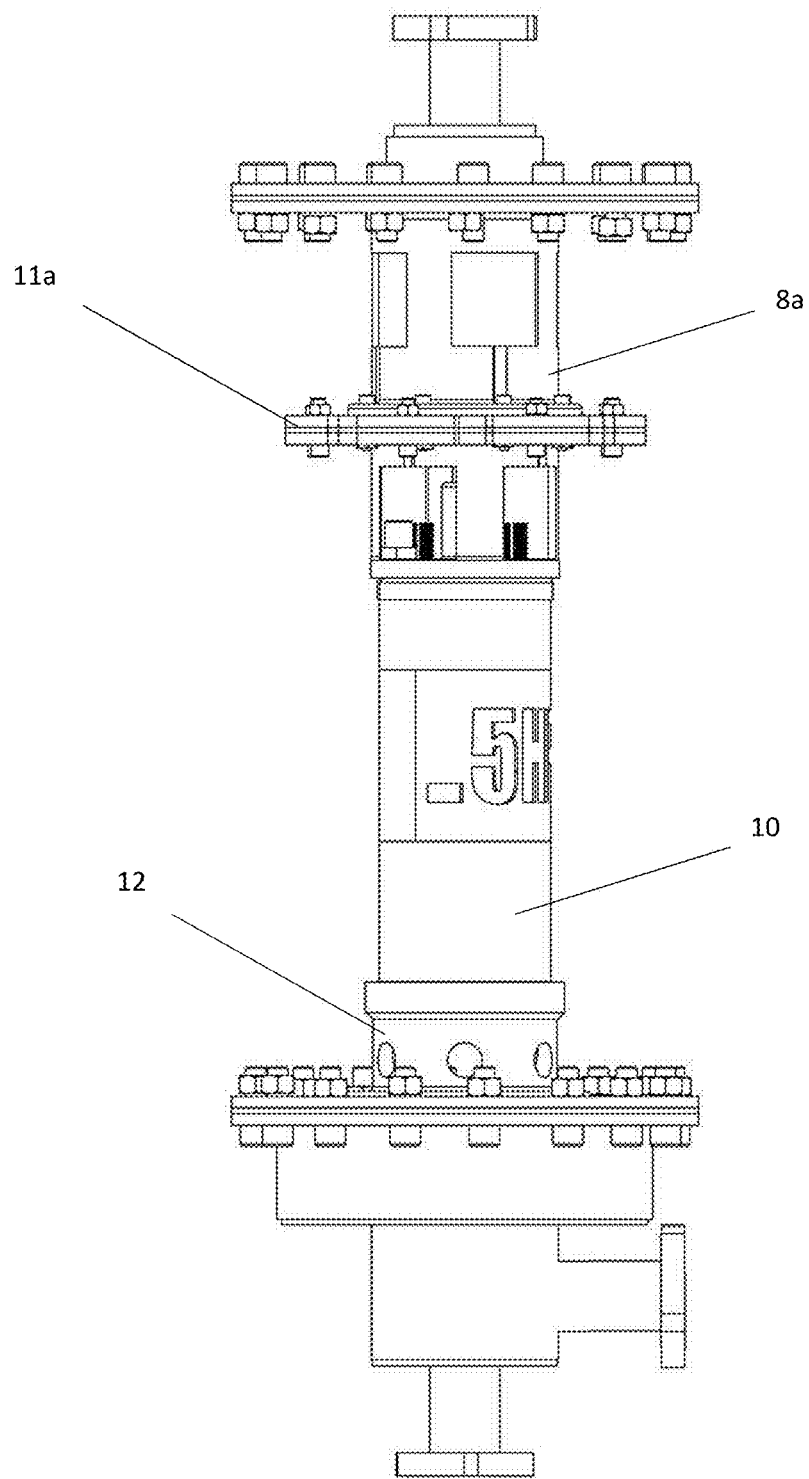
FIG. 4 shows the submersible actuator and filter cup of the automatic self-cleaning filter, in accordance with the principles of the present invention.
Figure 7C:
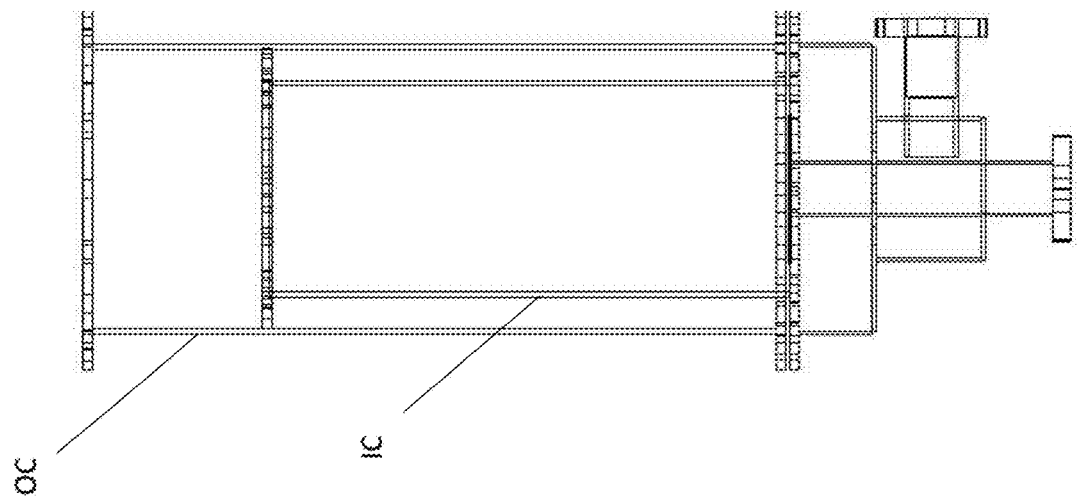
FIGS. 7A-C show different views of the location of the interior chamber in relation to the exterior chamber the automatic self-cleaning filter, in accordance with the principles of the present invention.
Figure 7B:
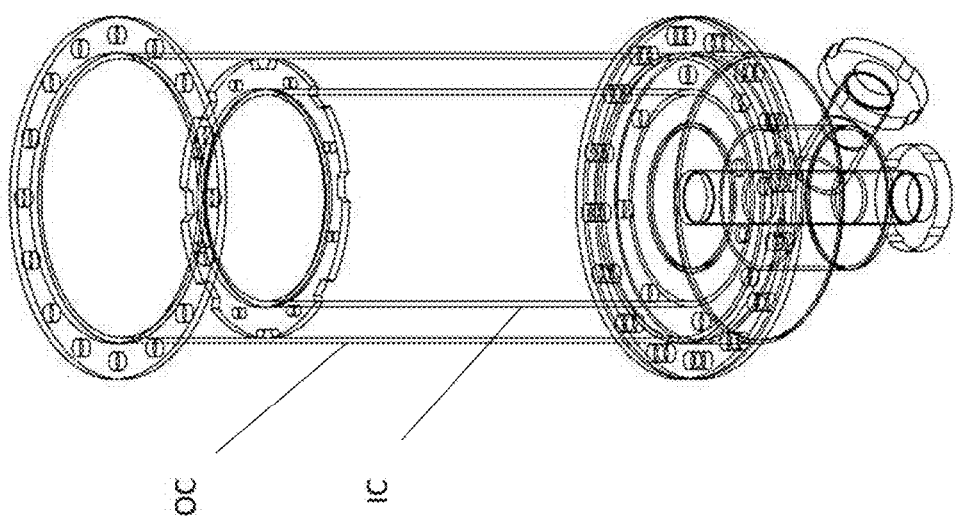
Figure 7A:
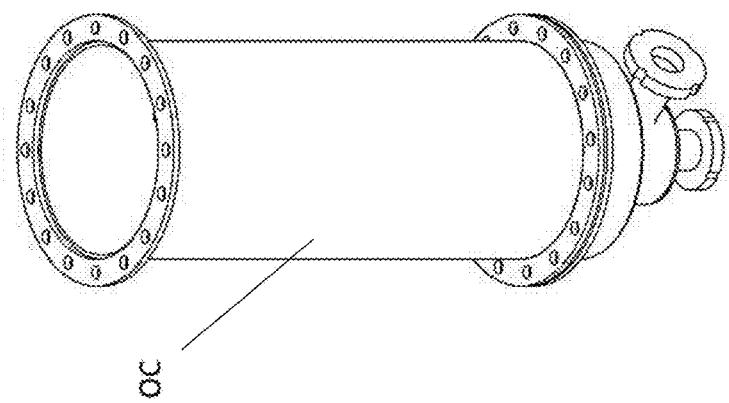

Additionally, the automatic self-cleaning filter 1 comprises a top cover plate 4 connected to or secured to the first chamber flange 2a on the first distal end DE1 of the outer chamber OC via one or more bolts, screws or fasteners S. The self-cleaning filter 1 may also include a gasket 5 (which may be a rubber gasket) located between the top cover plate 4 and the first chamber flange 2a, in order to seal any space between these two elements (i.e., the top cover plate 4 and first chamber flange 2a). Each of the top cover plate 4, gasket 5 and first chamber flange 2a includes one or more holes H1, as shown in FIG. 2, that align with each other and are configured to receive the one or more screws S. In this manner, the top cover plate 4, the gasket 5, and the first chamber flange 2a are tightly pressed against each other when secured via the one or more bolts, screws or fasteners S. The one or more bolts, screws or fasteners S may be further secured to the one or more holes H1 via a nut N.

The self-cleaning filter 1 further comprises a bottom chamber 6 having a bottom chamber flange 3 and one or more outlets OL1, OL2. It should be noted that each of the bottom chamber flange 3 and the second chamber flange 2b on the second distal end DE2 of the outer chamber OC, includes one or more holes H2, as shown in FIG. 2, that align with each other and are configured to receive one or more screws S2. In this manner, the second chamber flange 2b and bottom chamber flange 3 are tightly pressed against each other when secured via the one or more bolts, screws or fasteners S2. The one or more bolts, screws or fasteners S2 may be further secured to the one or more holes H2 via a nut N1. Moreover, a gasket G1 may be provided between the second chamber flange 2b and bottom chamber flange 3 in order to achieve a tighter connection between these two elements and avoid spillage of liquids or substances within the self-cleaning filter 1. From the foregoing discussion it is therefore apparent that the configuration of the self-cleaning filter 1 creates a hollow space inside the outer chamber OC that is flanked by the top cover plate 4 and the bottom chamber 6.

It should also be noted that the bottom chamber flange 3, which serves as a roof to the bottom chamber 6, includes at least one primary opening O1 and at least one secondary opening O2, as shown in FIGS. 5A-5E. The primary opening O1 is configured to guide or provide access to sediment within the interior chamber IC into a first outlet OL1, whereas the secondary opening O2 is configured to guide or provide access to filtered liquid within the outer chamber OC into the interior IS3 of the bottom chamber 6, which, in turn, includes a third opening O3 that leads directly into the second outlet OL2. As also shown in FIGS. 5A-5E, the primary opening O1 is located at the center of the bottom chamber flange 3 and comprises a hollow tube HT that leads directly into the first outlet OL1. It should be noted that the interior IS3 of the bottom chamber 6 surrounds or encloses the hollow tube HT that leads into the first outlet OL1. In an exemplary embodiment, the secondary opening O2 provide access to the filtered liquid into a first step FS within the interior of the bottom chamber 6, which in turn, leads the filtered liquid into a second step SS, which then leads the filtered liquid into the second outlet OL2, via the third opening O3, as shown in FIG. 5E.

As shown in FIGS. 4, and 8-13, the self-cleaning filter 1 further comprises a filter cup 8a, an interconnecting shaft 9a, a brush holder 9b, at least one brush 9c, a submersible actuator 10, an interconnecting plate 11a for providing support to the filter cup 8a, an interconnecting cup 11b for providing support to the interconnecting plate 11a, a lower cup 12 for supporting the submersible actuator 10, and an interior chamber IC, wherein each of the foregoing components are located within the outer chamber OC. It should be noted that the second outlet OL2 is configured to release the filtered liquid within the outer chamber OC; whereas the first outlet OL1 is configured to release the separated sediment or substance within the interior chamber IC. As such, the second outlet OL2 corresponds to the outer chamber OC, while the first outlet OL1 corresponds to the inner chamber IC. It should also be noted that the separated sediment or substance released via the first outlet OL1 does not come into contact with the filtered liquid or substance released via the second outlet OL2.

As also shown in FIG. 1, the top cover plate 4 includes at least one inlet IL that is configured to receive an unfiltered liquid or substance and to lead (or provide access to) said liquid or substance into the filter cup 8a. The filter cup 8a, in turn, comprises a receptacle R having a base B and walls that perpendicularly extend from said base B, thereby creating an opening O4 opposite to the base B that is configured to receive the unfiltered liquid or substance from the inlet IL. The base B, on the other hand, includes an opening O5 configured to provide access to the interconnecting shaft 9a and/or brush holder 9b into the receptacle R. The filter cup 8a further comprises a removable filter screen or mesh 8b surrounding and conforming to the interior side of the walls of the receptacle R. As such, the screen or mesh 8b is located within the interior space of the filter cup 8a, i.e., the receptacle R. Particularly, the mesh 8b is inserted through the opening O4 of the filter cup 8a and secured thereto via a rubber plug 14. It should be noted that the opening 5 in the base B also provides access into the interior chamber IC, thereby allowing the sediment within receptacle R to enter or fall into the interior chamber IC. The base B and receptacle R should preferably have a circular shape but may also have any other shape. Moreover, the filter cup 8a includes one or more openings O6, O7 on the side of the walls of the receptacle R which are covered by the mesh 8b. Spinning of the interconnecting shaft 9a, in response to power generated by the submersible actuator 10 (as further discussed below), causes the brush 9c to push the unfiltered liquid or substance against the interior side of the walls of the receptacle R, which will in turn cause the sediment to stay within the receptacle and the filtered liquid to pass through the screen or mesh 8b covering openings O6, O7 moving out of the receptacle R into the interior space IS1 within the outer chamber OC, and subsequently into the bottom chamber 6 until it reaches the second outlet OL2. The sediment left behind in the receptacle R, on the other hand, will be led into the interior chamber IC via the one or more holes H, and subsequently into the bottom chamber 6 until it reaches the first outlet OL1. The flow of the sediment within the self-cleaning filter 1 can be appreciated in FIG. 18.

It should be noted that the base B of the filter cup 8a is resting on the interconnecting plate 11a and secured thereto via one or more screws or fasteners S3. The interconnecting plate 11a comprises an opening O8 at its center that is configured to provide the interconnecting shaft 9a with access to the receptacle R of the filter cup 8a. An O-ring OR may be provided between the base B of the filter cup 8a and the interconnecting plate 11a, in order to prevent leakage of the sediment into the interior space IS1 within the outer chamber OC. The base B of the filter cup 8a includes a filter cup flange 17 having one or more holes H3 that are configured to receive one or more screws or fasteners S3. The interconnecting plate 11a also includes one or more holes H3 that are configured to receive the one or more screws or fasteners S3. Notably, the one or more holes H3 in the filter cup flange 17 and the interconnecting plate 11a, align with each other, thereby allowing the filter cup flange 17 and the interconnecting plate 11a to be tightly pressed against each other when secured via the one or more bolts, screws or fasteners S3. Lastly, the interconnecting plate 11a includes an additional set of holes H4 that do not align with the one or more holes H3 of the cup flange 17 (preferably located near the perimeter of the interconnecting plate 11a) and are configured to provide access to the liquid that has been filtered in the filter cup into the interior space IS1 within the outer chamber OC, until it reaches the secondary opening O2 on the bottom chamber 6, which in turn directs the filtered liquid into the third opening O3, and once there, the filtered liquid is directly led into the second outlet OL2, where it ultimately exits the self-cleaning filter 1. The flow of the filtered liquid within the self-cleaning filter 1 can be appreciated in FIG. 18.

Figure 11A:
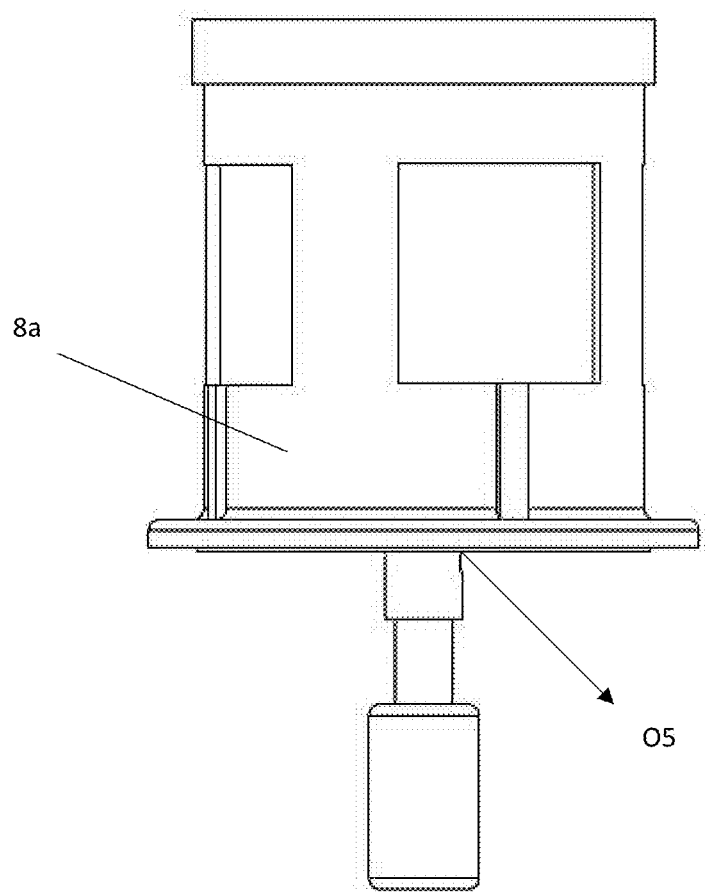
FIGS. 11A-B show different views of the filter cup of the automatic self-cleaning filter, in accordance with the principles of the present invention.
Figure 11B:
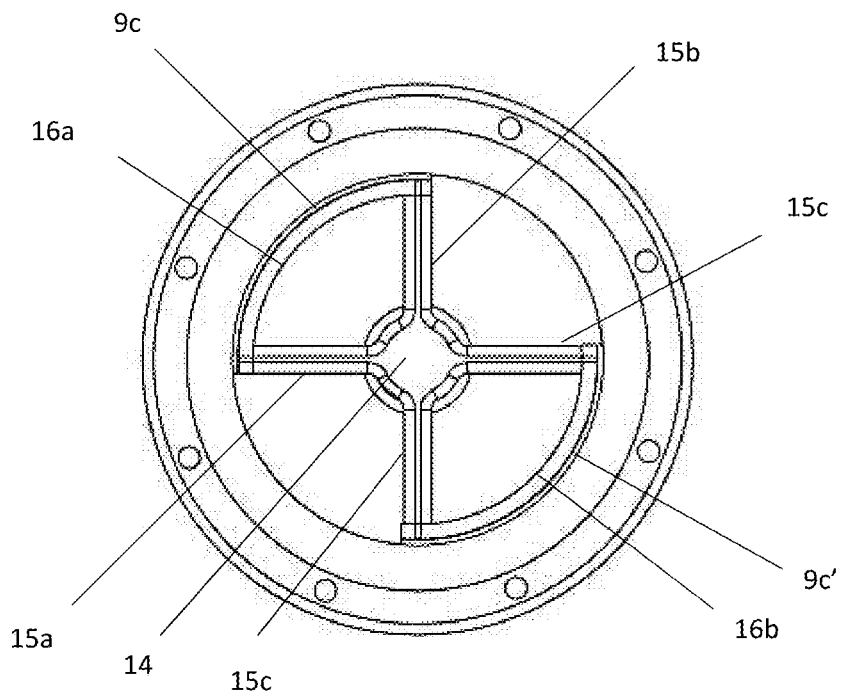
Figure 12A:
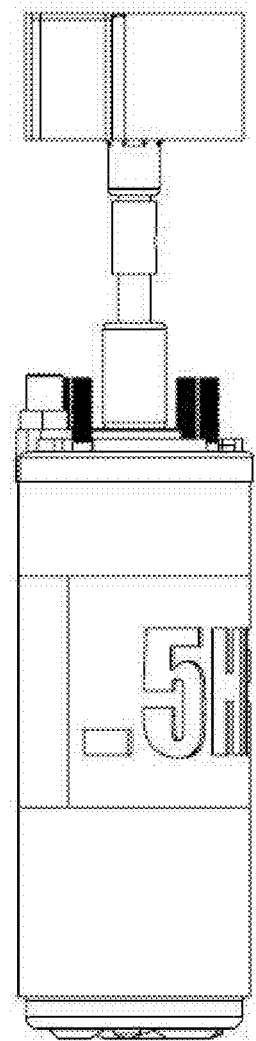
FIGS. 12A-B show the submersible actuator and brush of the automatic self-cleaning filter, in accordance with the principles of the present invention.
Figure 12B:
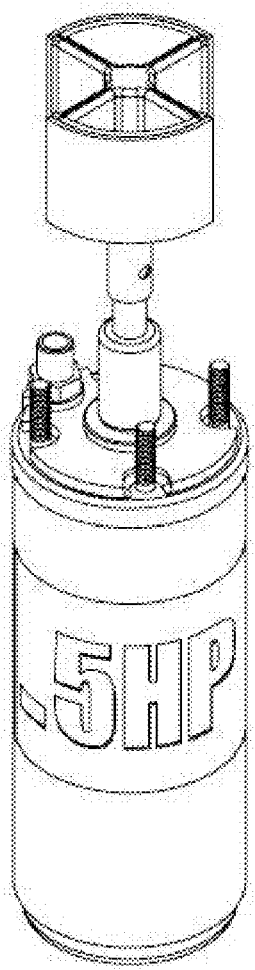
Figure 13:
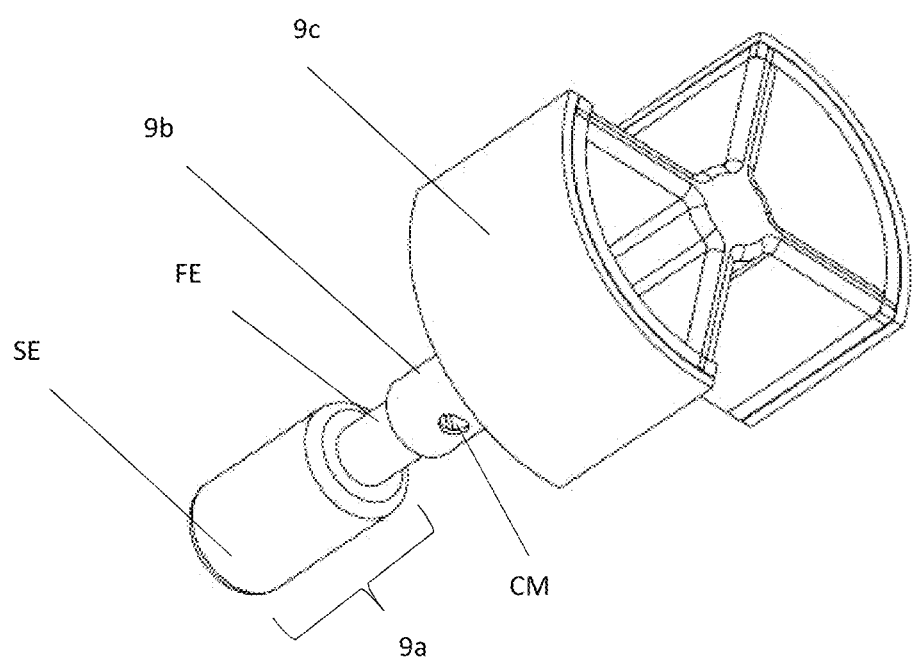
FIG. 13 shows the brush of the self-cleaning filter, in accordance with the principles of the present invention.
Figure 14:
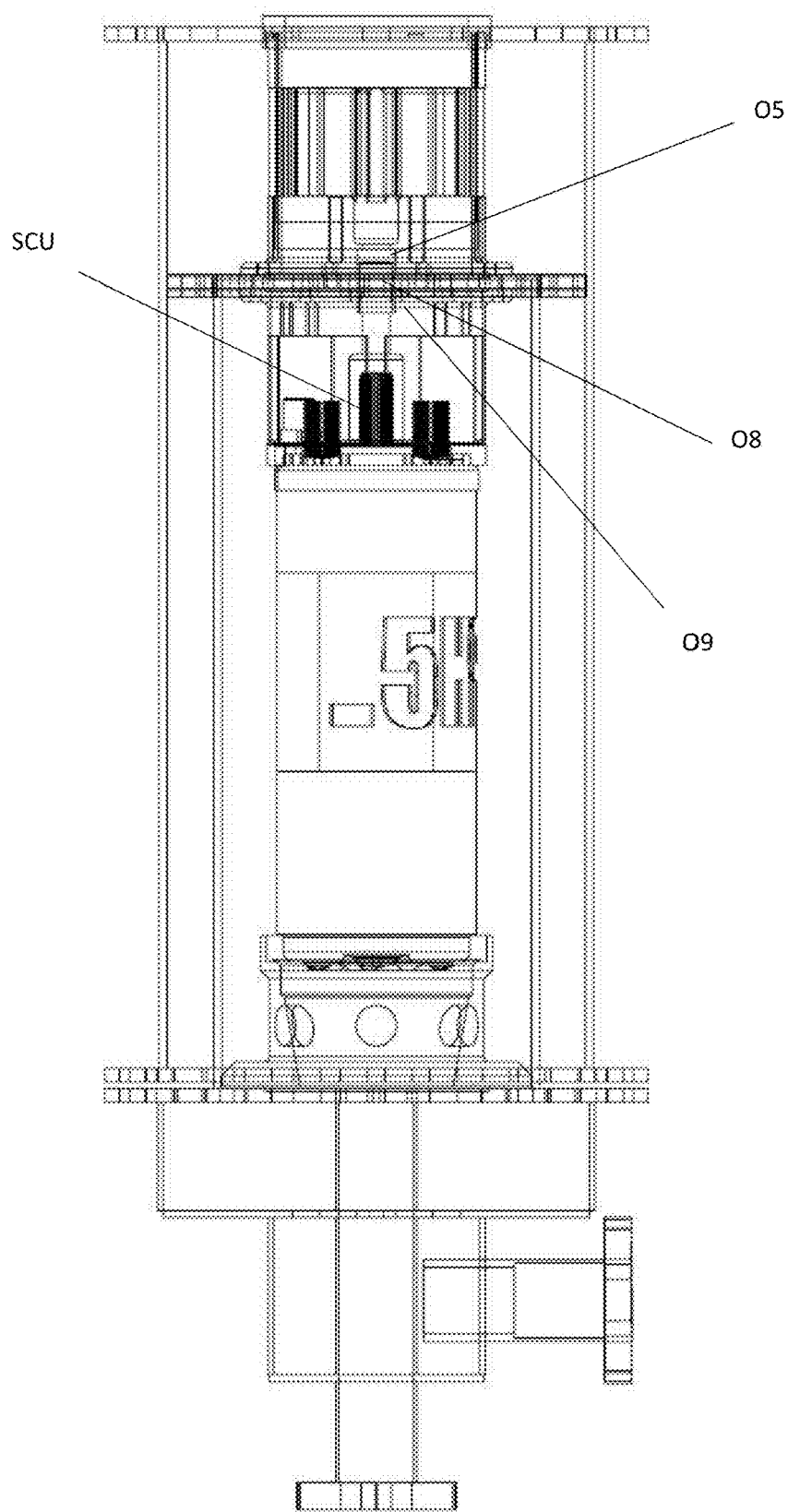
FIG. 14 shows the interior components of the self-cleaning filter, in accordance with the principles of the present invention.
Figure 15:
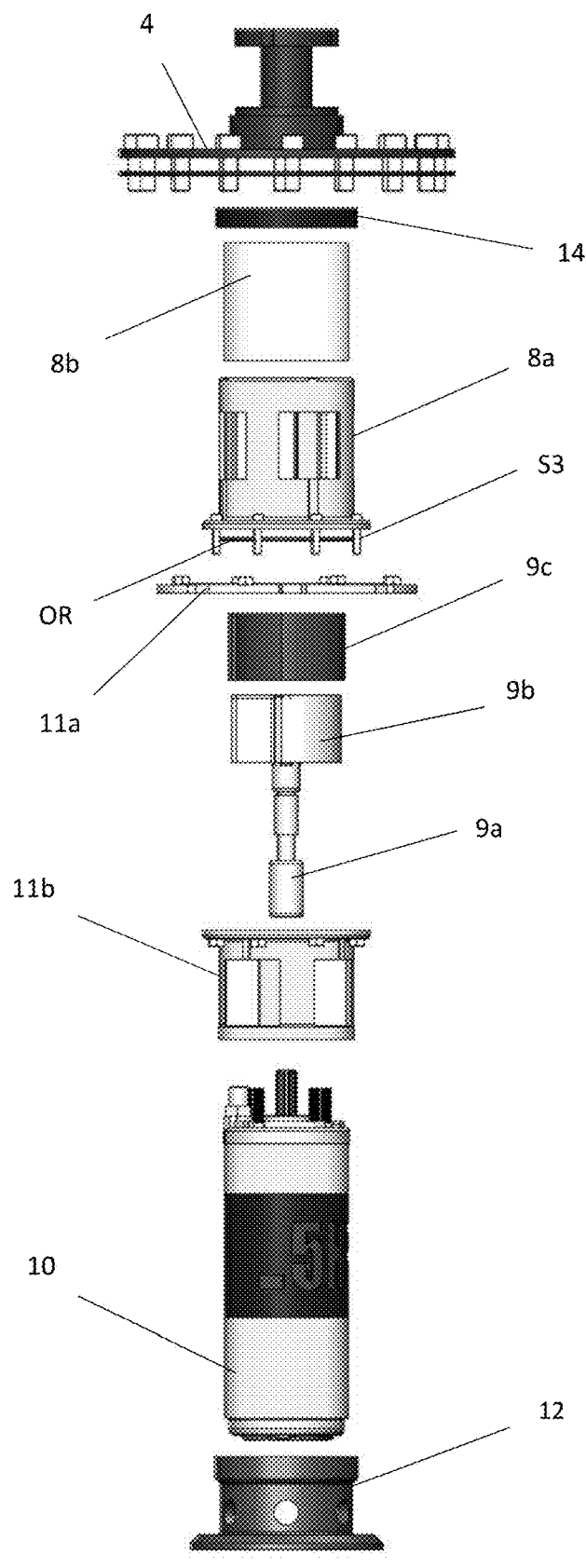
FIG. 15 shows an exploded view of some of the interior components of the self-cleaning filter, in accordance with the principles of the present invention.
Figure 16:
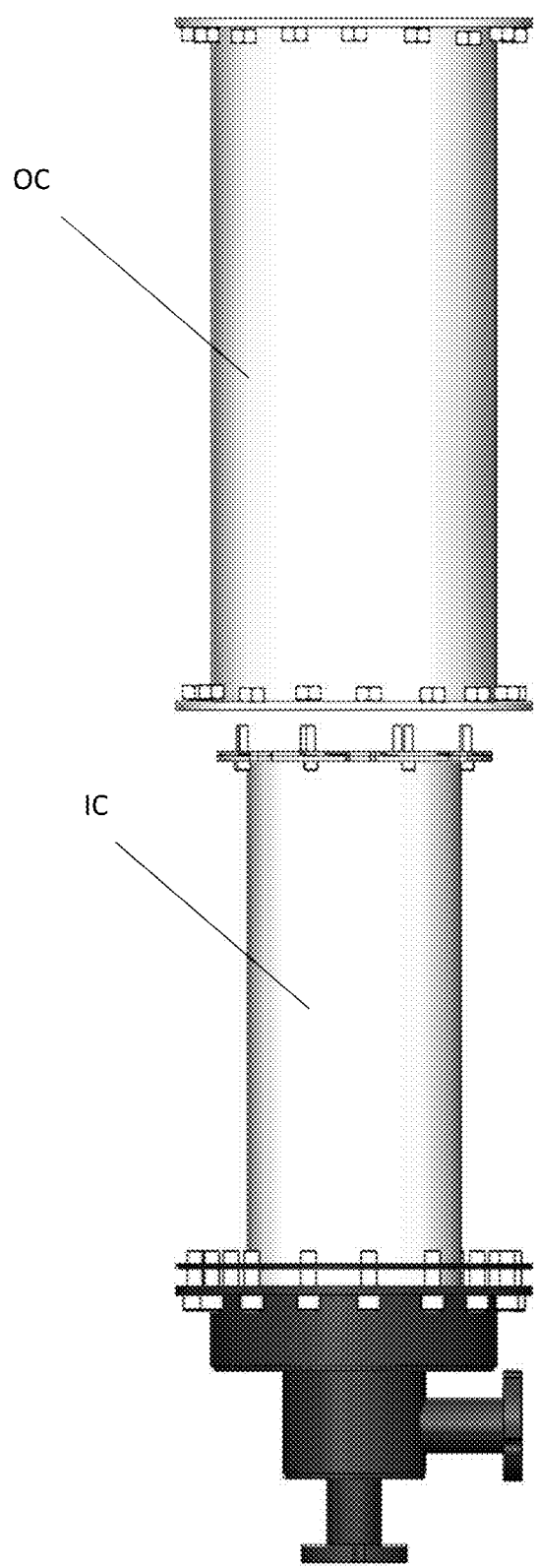
FIG. 16 shows an exploded view of some of the components of the self-cleaning filter, in accordance with the principles of the present invention.

It should be noted that the interconnecting shaft 9a includes a first end FE and a second end SE, as shown in FIG. 13. The first end FE of the shaft 9a is configured to be coupled to the brush holder 9b via a coupling mechanism CM. The second end SE of the shaft 9a, on the other hand, is configured to be coupled to a top end of the submersible actuator 10 via a shaft coupling unit SCU. The brush holder 9b, in turn, comprises a rod 14 with four walls 15a-d extending perpendicularly therefrom, as shown in FIG. 11B. Moreover, the brush holder 9b comprises a first interconnecting wall 16a that i) connects the first and second walls 15a, 15b of the brush holder 9b; ii) conforms to the shape of the receptacle R of the filter cup 8a; and iii) is configured to interact with the mesh 8b on the interior side of the walls of the receptacle R when the brush holder 9b is actuated by the actuator 10. Similarly, the brush holder 9b comprises a second interconnecting wall 16b that i) connects the third and fourth walls 15c, 15d of the brush holder 9b; ii) conforms to the shape of the receptacle R of the filter cup 8a; and iii) is configured to interact with the mesh 8b on the interior side of the walls of the receptacle R when the brush holder 9b is actuated by the actuator 10.

Figure 19A:
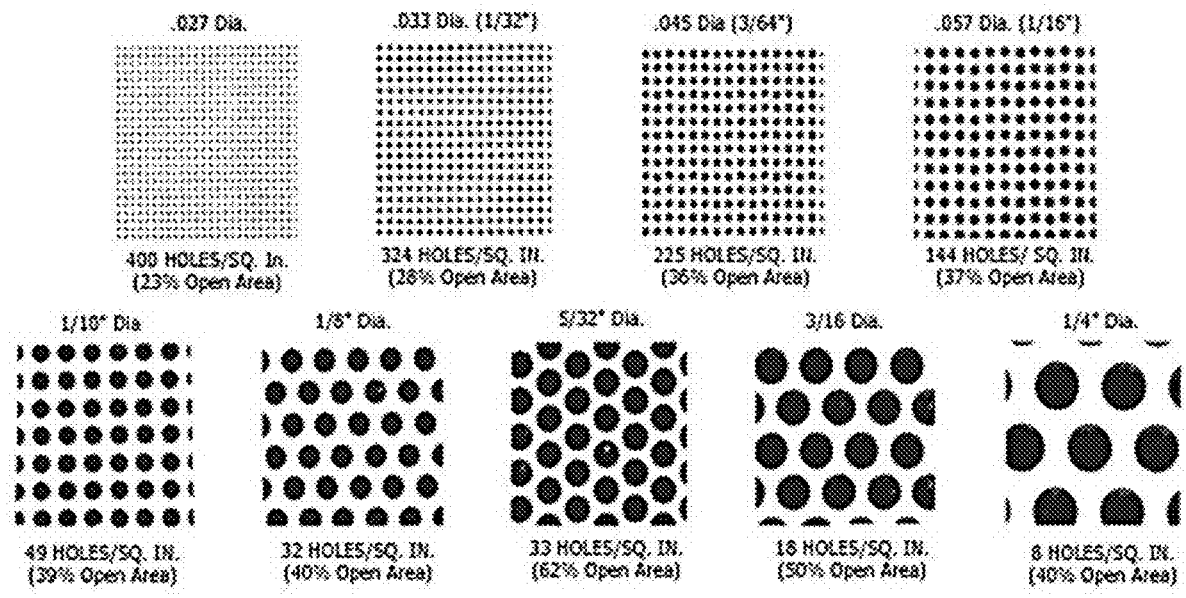
FIGS. 19A-B show exemplary diameters of the perforations included in the screen of the brush of the self-cleaning filter may have, in accordance with the principles of the present invention.
Figure 19B:
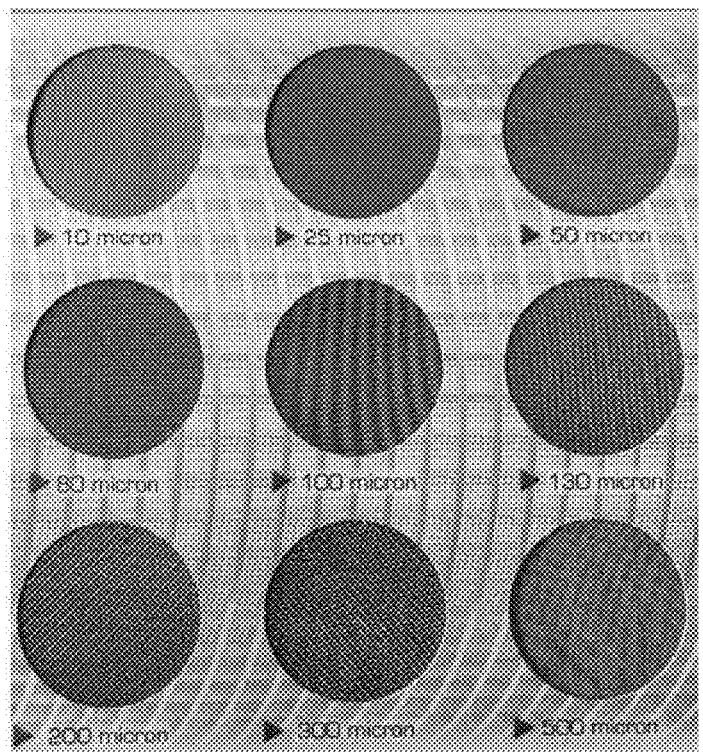
Figure 20:
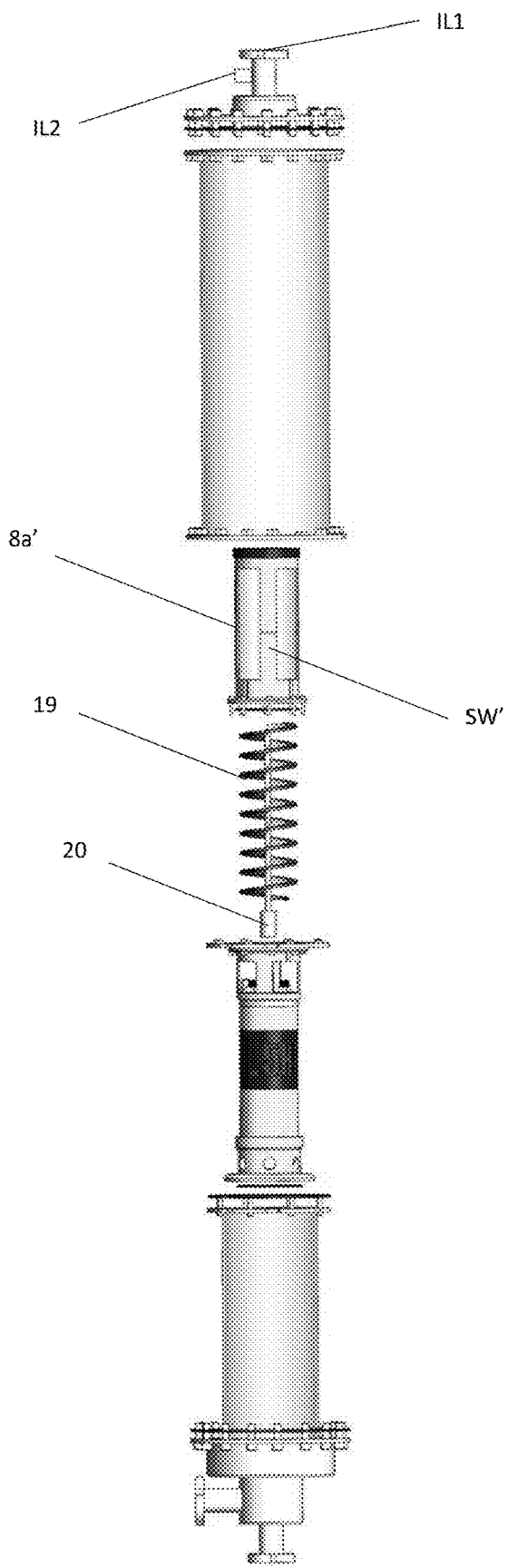
FIG. 20 shows an exploded view of the components of an alternate embodiment of the self-cleaning filter, in accordance with the principles of the present invention.
Figure 21:
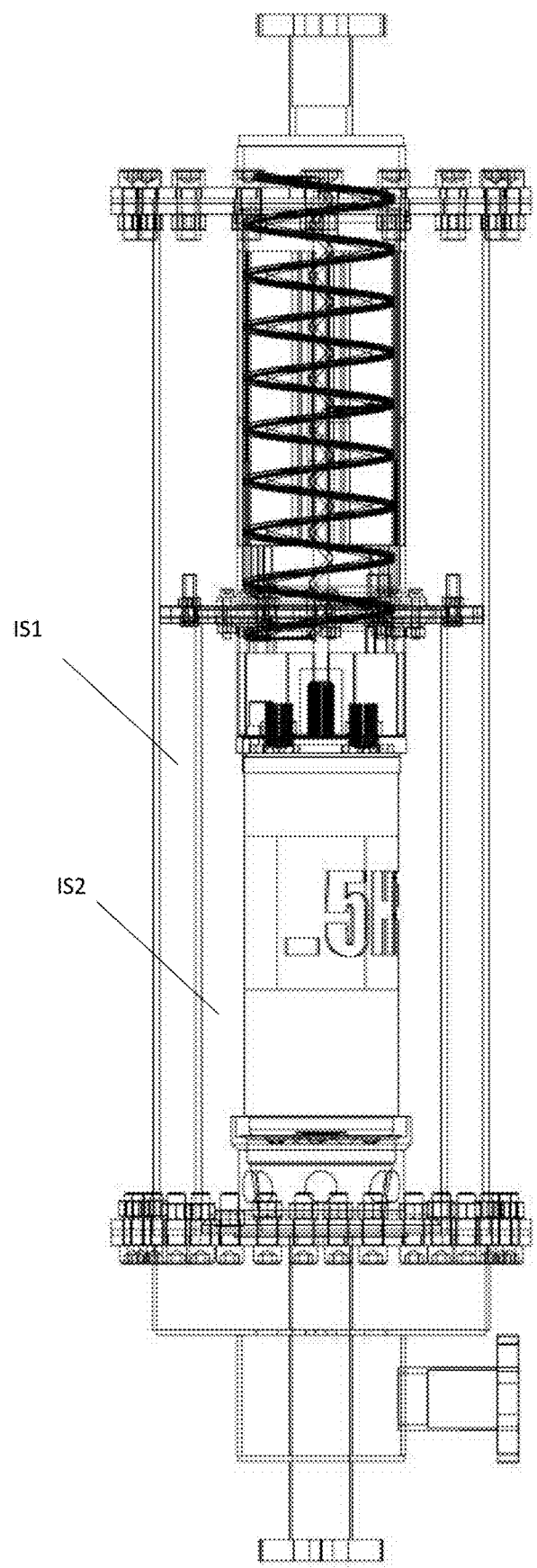
FIG. 21 shows the internal components of the alternate embodiment of the self-cleaning filter, in accordance with the principles of the present invention.
Figure 22:
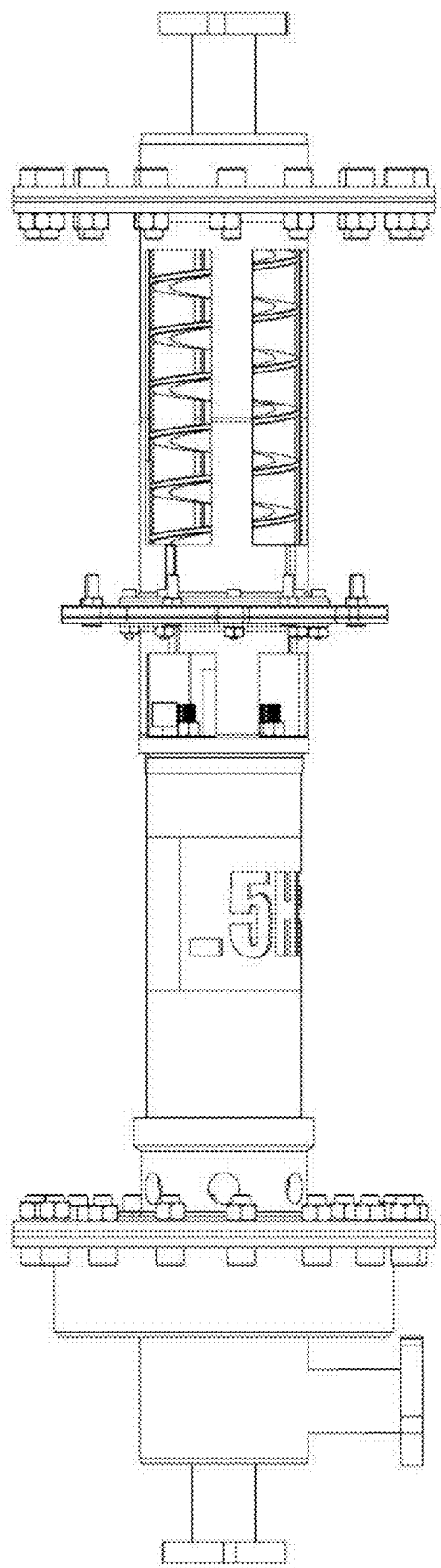
FIG. 22 shows some of the internal components of the alternate embodiment of the self-cleaning filter, in accordance with the principles of the present invention.
Figure 23:
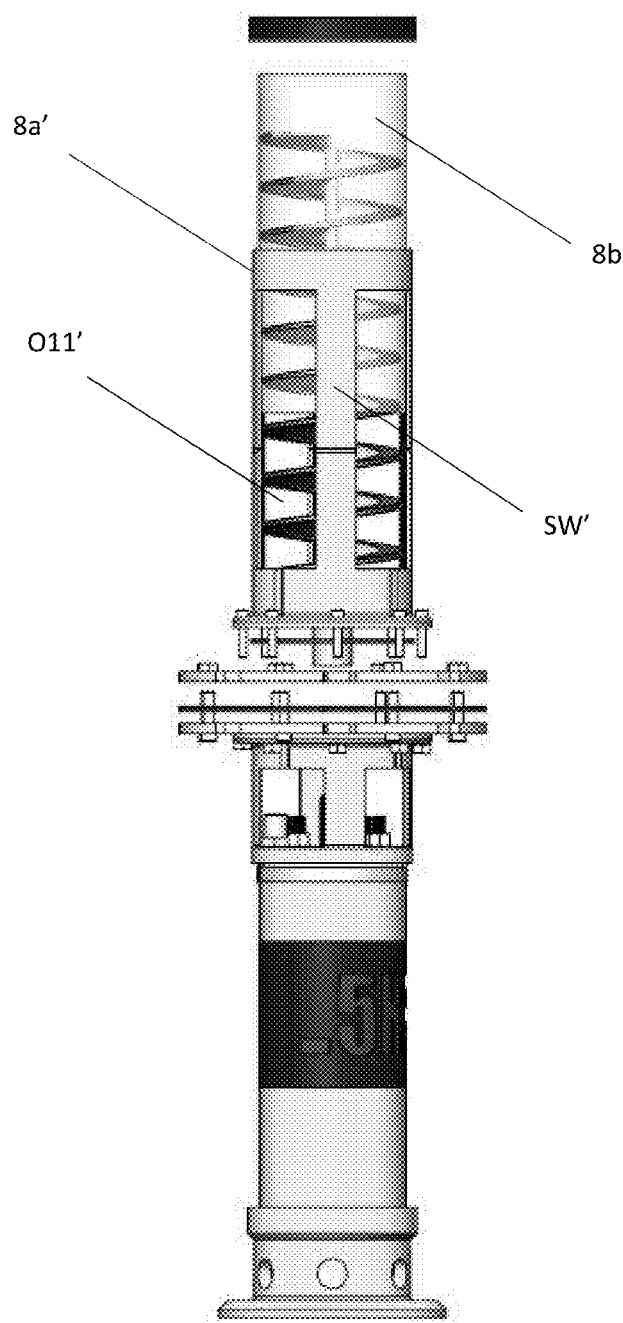
FIG. 23 shows some of the internal components of the alternate embodiment of the self-cleaning filter, in accordance with the principles of the present invention.

The at least one brush 9c, in turn, comprises filaments configured to scrub or scour a surface; and can be manufactured from materials such as plastic, stainless steel, aluminum, nylon, or any other similar material. It should be noted that each of the interconnecting walls 16a, 16b are configured to secure the at least one brush 9c. One brush 9c completely covers the side of the first interconnecting wall 16a facing the interior of the receptacle R; and another brush 9c' covers completely covers the side of the second interconnecting wall 16b facing the interior of the receptacle R. Lastly, it should be noted that by conforming to the shape of the receptacle R, the interconnecting walls 16a, 16b in the brush 9c, 9c' can more efficiently interact with the interior side of the walls of the receptacle R, and cause the filtered liquid to pass through the screen or mesh 8b and out of the receptacle R into the interior space IS1 within the outer chamber OC. The mesh 8b, in turn, can comprise a perforated metal-type material (preferably stainless steel) or a mesh-type material. The perforated metal-type material includes a plurality of perforations configured to filter the liquid coming from the receptacle R. The plurality of perforations can have different diameters, as shown in FIG. 19A. The smaller the diameter of the perforations, the higher the rate of filtration will be for the liquid. The mesh-type material, on the other hand, comprises a screen having perforations measuring from 10 microns up to 800 microns, as shown in FIG. 19B.

Figure 9:
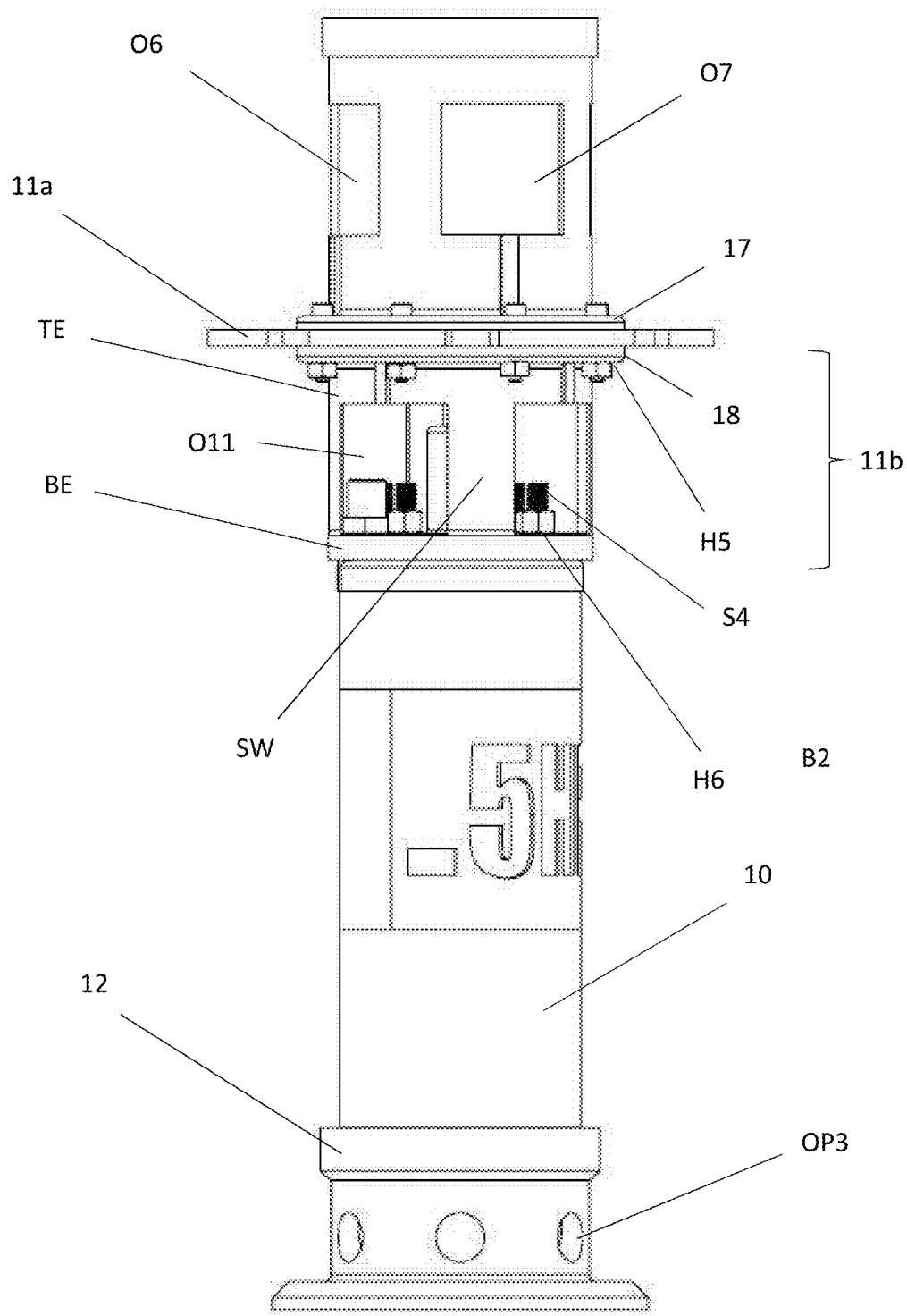
FIG. 9 shows the interior components of the automatic self-cleaning filter, in accordance with the principles of the present invention.
Figure 10:
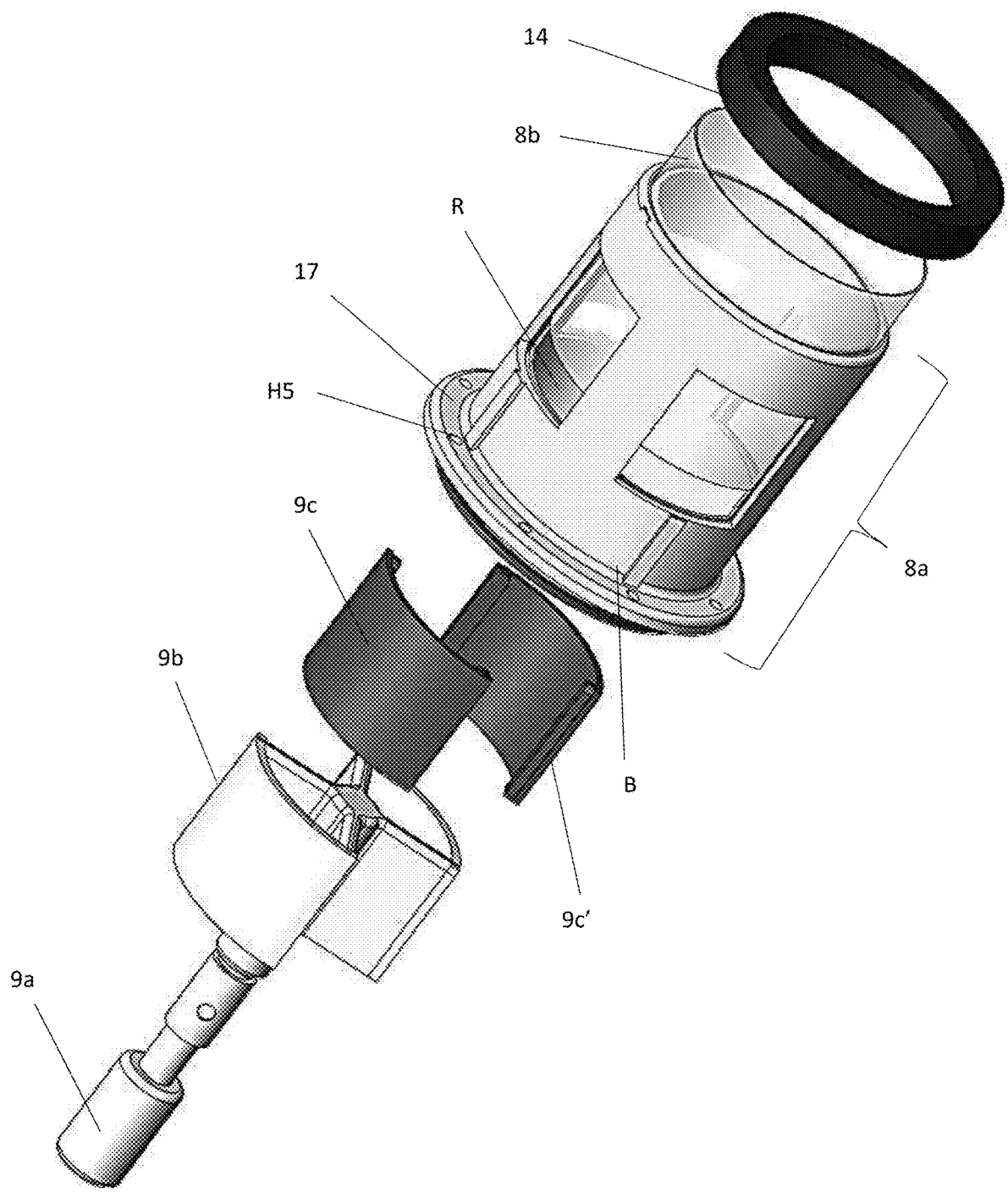
FIG. 10 shows an exploded view pf the components within the filter cup of the automatic self-cleaning filter, in accordance with the principles of the present invention.

As previously noted, the self-cleaning filter 1 includes an interconnecting cup 11b for supporting the interconnecting plate 11a. The interconnecting cup 11b comprises a base B2 with side walls SW having a top end TE and a bottom end BE, as shown in FIG. 9. The top end TE includes an opening O9 that is configured to receive the sediment from the filter cup 8a. The bottom end BE, on the other hand, includes an opening O10 configured to provide access to the interconnecting shaft 9a and brush holder 9b into the base B2. Moreover, the side walls SW include one or more openings O11 that are configured to lead the sediment coming from the filter cup 8a into the interior space IS2 within the interior chamber IC, where it will then be led into the bottom chamber 6 until it reaches the first outlet OL1. The shape of the interconnecting cup 11b should preferably be consistent with the shape of the actuator 10 and filter cup 8a but may have any other shape as long as it fits within the interior chamber IC.

Figures 8A, 8B:
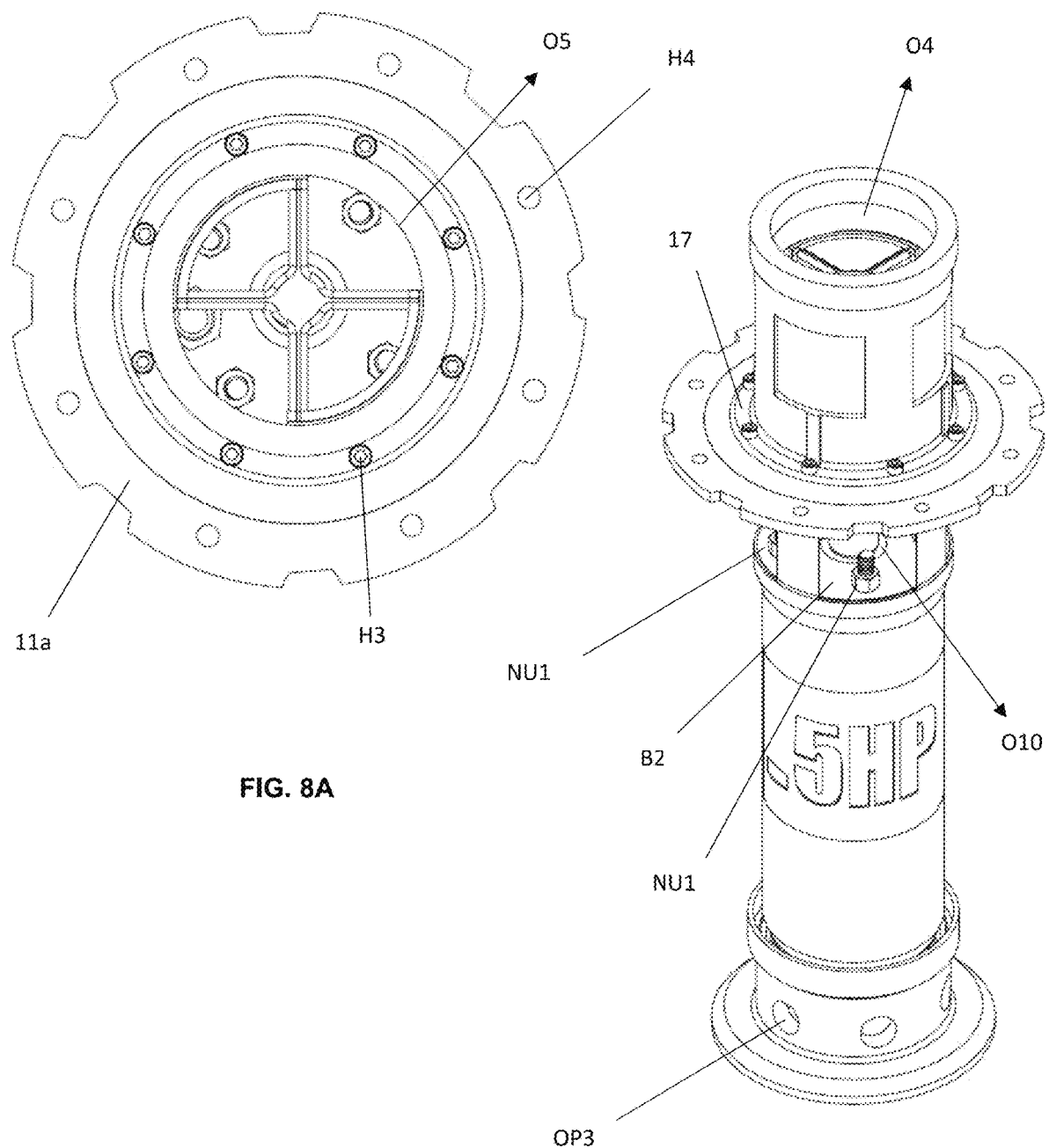
FIGS. 8A-B show different views of the submersible actuator and filter cup of the automatic self-cleaning filter, in accordance with the principles of the present invention.

It should be noted that the top end TE of the interconnecting cup 11b has a flange 18 with one or more holes H5 configured to receive the one or more screws or fasteners S3, which also secures the interconnecting plate 11a to both the filter cup 8a and the interconnecting cup 11b. Notably, the one or more holes H3 and H5 align with each other, thereby allowing the filter cup flange 17, the flange 18 on the top end TE, and the interconnecting plate 11a to be tightly pressed against each other when secured via the one or more bolts, screws or fasteners S3, as shown in FIG. 9. The base B2 of the interconnecting cup 11b, on the other hand, includes one or more holes H6 configured to receive one or more screws S4 emanating from the top end of the actuator 10. The interconnecting cup 11b is then secured to the top of the actuator 10 via one or more nuts NU1, NU2 that are configured to interact with the one or more screws S4, as shown in FIGS. 8A and 8B.

As also noted, the self-cleaning filter 1 includes a lower cup 12 configured to support the submersible actuator 10. Particularly, the bottom end of the submersible actuator 10 is coupled or secured to the lower cup 12, which serves as a base for the submersible actuator 10 and holds it in place within the interior chamber IC. It should be noted that the lower cup 12 is secured (preferably welded) to the bottom chamber flange 3 on the bottom chamber 6; and that it includes one or more openings OP3, as shown in FIGS. 8B and 9, that are configured to provide access to the sediment within the interior chamber IC into the primary opening O1 on the bottom chamber flange 3, which in turn, leads the sediment into the first outlet OL1, thereby allowing the separated sediment to exit the self-cleaning filter 1. From the foregoing it is therefore apparent that securing the interconnecting plate 11a to both the filter cup 8a and the interconnecting cup 11b, creates barrier that has the effect of enclosing the interconnecting cup 11b, the submersible actuator 10 and the lower cup 12 within the interior chamber IC, thereby isolating these elements, as well as the substances within the interior chamber IC, from the outer chamber OC.

The brush holder 9b is actuated by the submersible actuator 10. As previously indicated, actuation of the brush holder 9b is possible because the interconnecting shaft 9a is connected or coupled to the actuator 10 via the shaft coupling unit SCU. When the actuator 10 is in operation, it causes the brush holder 9b to vigorously spin or rotate, thereby allowing the brush 9c to filter the liquid or substance within the receptacle R of the filter cup 8a. It should be noted that the submersible actuator 10 may be a submersible electric motor; or a submersible pneumatic or hydraulic motor, as described in previous applications in the same patent family of the invention. For embodiments having an electric motor, the self-cleaning filter 1 comprises at least one electric power connector on the top cover plate 4. The horsepower of the submersible electric motor should preferably be between 0.3 HP and up to 300 HP. In some embodiments, however, the horsepower range may be higher or lower. For embodiments having a submersible pneumatic or hydraulic motor, the self-cleaning filter 1 is connected to a pneumatic or hydraulic power source that provides power to the pneumatic or hydraulic motor via inputs on the bottom chamber flange 3, which in turn are connected to the submersible pneumatic or hydraulic motor.

Figure 17:
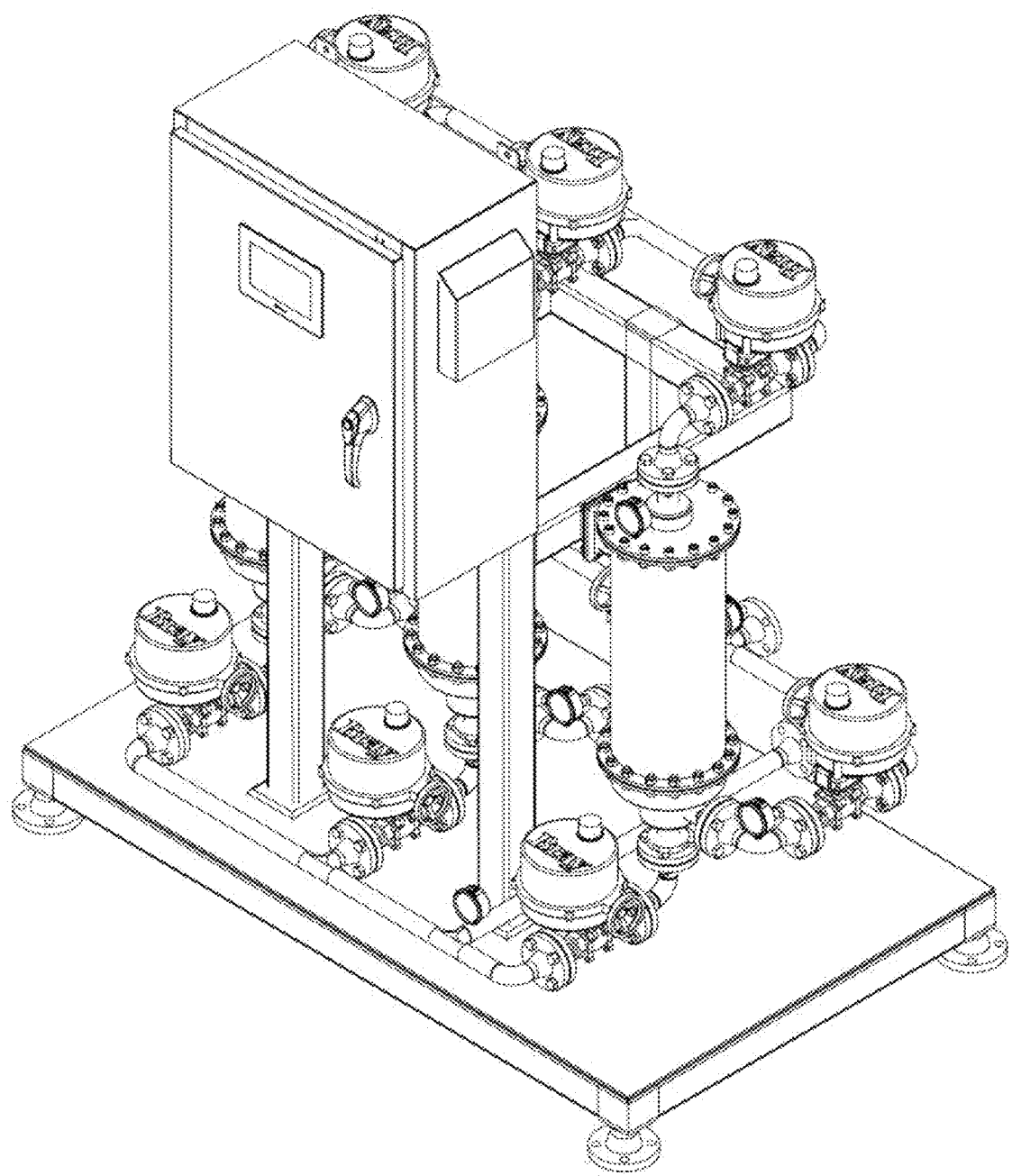
FIG. 17 shows the self-cleaning filter as part of a skid filtration system, in accordance with the principles of the present invention.
Figure 18:
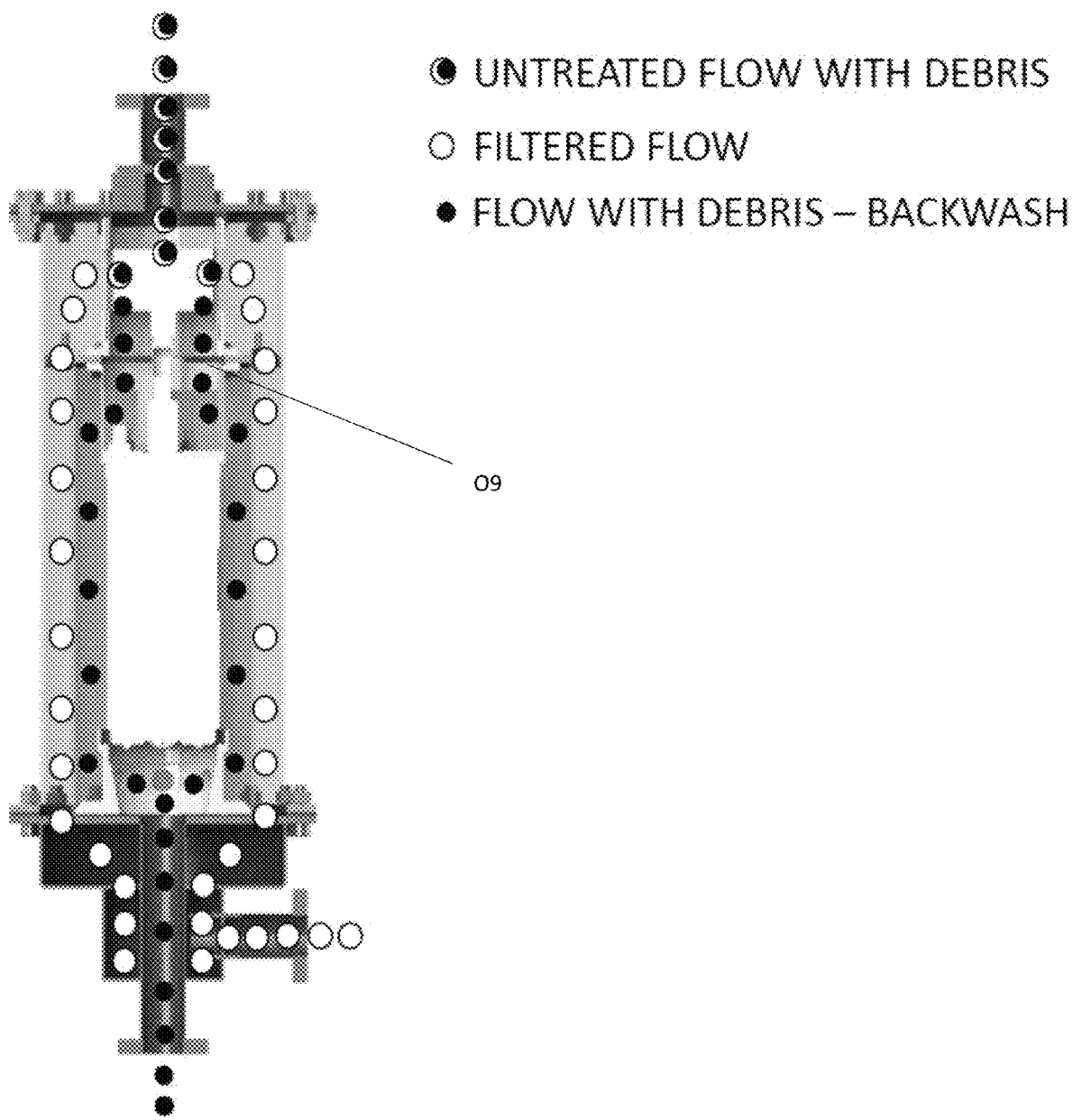
FIG. 18 shows the flow of substances within the self-cleaning filter, in accordance with the principles of the present invention.

It should be noted that the self-cleaning filter 1 may be used alone or as part of a skid filtration system, as shown in FIG. 17. It should also be noted that the self-cleaning filter 1 includes a first valve V1 on the primary opening O1 at the center of the bottom chamber flange 3; and a second valve V2 at the third opening O3 that leads to the second outlet OL2, a shown in FIG. 5E. Initially the valve V1 is closed as sediment accumulates within the interior chamber IC. While the valve V1 is closed, filtered liquid will come out through the second outlet OL2. Once the interior chamber IC substantially fills out with sediment, the first valve V1 will open up while the second valve V2 will close up; thereby interrupting the release of filtered liquid via the second outlet OL2 and causing the sediment to be released via the first outlet OL1. Likewise, once the sediment is released from the interior chamber IC, the first valve V1 will close up, and the second valve will open up the second outlet OL2, thereby allowing filtered liquid to be once again released via the second outlet OL2.

As shown in FIGS. 20-23, the self-cleaning filter 1 may be modified for sludge thickening applications. In this alternate embodiment, the self-cleaning filter 1 includes a first inlet IL1 and a second inlet IL2. The first inlet IL1 is configured to receive sludge or similarly thick substances, whereas the second inlet IL2 is configured to receive one or more polymer solutions. The polymer solution helps in dehydrating the water particles from the sludge. The alternate embodiment works similarly to the first embodiment but with some but with some structural modifications, as described below.

In particular, the alternate embodiment, instead of having an interconnecting shaft 9a, brush holder 9b, and brush 9c, the self-cleaning filter 1 comprises an auger 19 with an integrated brush, wherein said auger 19 has a shaft 20 that is coupled to the actuator 10 via the shaft coupling unit SCU. The auger 19 comprises a rotating or helical metal shaft preferably manufactured form stainless steel but may also me manufactured from any other durable material. Additionally, in this alternate embodiment, the self-cleaning filter 1 comprises a filter cup 8a' that is structurally similar to the filter cup 8a previously described for the first embodiment but with larger side walls SW' in order to account for the larger size of the auger 19 in comparison to the size of the interconnecting shaft 9a and brush holder 9b. The side walls SW' also comprise one or more openings O11' that are configured to lead the solid filtered liquid into the interior space IS1 within the outer chamber OC, where it will be led into the bottom chamber 6 until it reaches the second outlet OL2.

The self-cleaning filter 1 in the alternate embodiment also comprises a much larger mesh 8b', in comparison with the mesh 8*b*, in order to cover the larger one or more openings OI1' on the side walls SW'. Here, rotation of the auger 19 causes the sludge to move along the helical shaft and to be pushed against the mesh 8*b*'. This rotation causes separation of the liquid and solid particles in the sludge. Specifically, the rotation of the auger 19 creates centrifugal forces that cause the solid particles in the sludge to move into the interior space IS2 of the interior chamber IC, where they will ultimately be led to the first outlet OL1; and the liquid particles to move through the mesh 8*b*' into the interior space of the outer chamber OC, where they will ultimately be led to the second outlet OL2.

As such, when the sludge is introduced via the first inlet IL1 and the polymer solution is introduced via the second inlet IL2, the combined substances (or mixture) will be led into the filter cup 8*a*'. Once in there, the centripetal forces created by rotation of the auger 19 will cause the solid particles from the sludge to move into the interior space IS2 of the interior chamber IC, where they will be led to the bottom chamber 6 and ultimately into the first outlet OL1, thereby allowing the solid sludge particle to exit the self-cleaning filter 1. Similarly, the centripetal forces will cause the liquid particles to move through the mesh 8*b*' into the interior space of the outer chamber OC, they will be led to the bottom chamber 6 and ultimately into to the second outlet OL2.

In summary of the previous sections, the disclosure presented here is structurally innovative, presents advantages not available at the moment with blending system, complies with all new patent application requirements and is hereby lawfully submitted to the patent bureau for review and the granting of the commensurate patent rights.

While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patentable distinguish any amended claims from any applied prior art.

What is claimed is:

1. An automatic self-cleaning filter, comprising:
   an outer chamber having a first distal end and a second distal end, wherein each distal end is opposite to each other;
   wherein the first distal end of the outer chamber includes a first chamber flange;
   wherein the second distal end of the outer chamber includes a second chamber flange;
   a top cover plate connected to or secured to the first chamber flange on the first distal end of the outer chamber;
   a bottom chamber having a bottom chamber flange, a first outlet and a second outlet;
   wherein the bottom chamber is connected to or secured to the second chamber flange on the second distal end of the outer chamber;
   a filter cup;
   an auger having a shaft and an integrated brush;
   a submersible actuator;
   an interconnecting plate for providing support to the filter cup;
   an interconnecting cup for providing support to the interconnecting plate;
   a lower cup for supporting the submersible actuator; and
   an interior chamber within the outer chamber;
   wherein the second outlet has access to the outer chamber and the first outlet has access to the interior chamber;
   wherein the top cover plate includes a first inlet and a second inlet;
   wherein the first inlet is configured to receive sludge and to provide access to said sludge into the filter cup;
   wherein the second inlet is configured to receive one or more polymer solutions and to provide access to said one or more polymer solutions into the filter cup;
   wherein the filter cup comprises a receptacle having a base and walls that perpendicularly extend from said base, thereby creating an opening opposite to the base that is configured to receive the mixture of sludge and one or more polymer solutions from the first and second inlets;
   wherein the base of the receptacle includes an opening configured to provide access to the interconnecting shaft into the receptacle;
   wherein the filter cup further comprises, within the receptacle, a removable filter screen or mesh surrounding and conforming to the walls of the receptacle;
   wherein the filter cup includes one or more openings on the walls of the receptacle that are covered by the filter screen or mesh;
   wherein the interconnecting plate includes one or more holes configured to provide access to liquid that has been filtered in the filter cup into an interior space within the outer chamber; and
   wherein the bottom chamber flange of the bottom chamber has a primary opening and a secondary opening.

2. The automatic self-cleaning filter of claim 1, wherein the primary opening on the bottom chamber is configured to guide or provide access to sediment within the interior chamber into the first outlet.

3. The automatic self-cleaning filter of claim 2, wherein the primary opening comprises a hollow tube that leads directly into the first outlet.

4. The automatic self-cleaning filter of claim 1, wherein the secondary opening configured on the bottom chamber to guide or provide access to filtered liquid within the outer chamber into the interior of the bottom chamber.

5. The automatic self-cleaning filter of claim 4, wherein the bottom chamber includes a third opening that leads directly into the second outlet.

6. The automatic self-cleaning filter of claim 1, wherein filter screen or mesh comprises a perforated metal-type material or a mesh-type material.

7. The automatic self-cleaning filter of claim 1, wherein the filter cup is secured to the interconnecting plate.

8. The automatic self-cleaning filter of claim 1, wherein the interconnecting cup is secured to both the interconnecting plate and the actuator.

9. The automatic self-cleaning filter of claim 1, wherein the lower cup is secured to the bottom chamber flange on the bottom chamber and includes one or more openings that are configured to provide access to the sediment within the interior chamber into the primary opening on the bottom chamber flange.

\* \* \* \* \*